United States Patent
Martino et al.

(10) Patent No.: US 9,518,672 B2
(45) Date of Patent: Dec. 13, 2016

(54) ELECTRONICALLY ACTUATED GATE VALVE

(75) Inventors: Jerry Allen Martino, Houston, TX (US); Vinay Shyamlal Varma, Cypress, TX (US); Keith McKinley Adams, Katy, TX (US)

(73) Assignee: Cameron International Corporation, Houston, TX (US)

( * ) Notice: Subject to any disclaimer, the term of this patent is extended or adjusted under 35 U.S.C. 154(b) by 1688 days.

(21) Appl. No.: 12/820,096

(22) Filed: Jun. 21, 2010

(65) Prior Publication Data
US 2011/0308619 A1    Dec. 22, 2011

(51) Int. Cl.
*F16K 3/02* (2006.01)
*F16K 31/04* (2006.01)
*E21B 34/02* (2006.01)
*F16K 17/38* (2006.01)

(52) U.S. Cl.
CPC .............. *F16K 31/04* (2013.01); *E21B 34/02* (2013.01); *F16K 3/0254* (2013.01); *F16K 17/38* (2013.01); *Y10T 137/0318* (2015.04); *Y10T 137/1819* (2015.04)

(58) Field of Classification Search
CPC ........ F16K 31/04; F16K 3/0254; F16K 17/38; E21B 34/02; Y10T 137/0318; Y10T 137/1819
USPC ........... 137/75, 79; 251/129.11, 129.01, 326, 251/129.04
See application file for complete search history.

(56) References Cited

U.S. PATENT DOCUMENTS

| | | | | | |
|---|---|---|---|---|---|
| 3,628,397 | A | * | 12/1971 | Sheesley .......................... | 74/625 |
| 3,659,624 | A | * | 5/1972 | Kelly et al. ..................... | 137/75 |
| 3,771,540 | A | * | 11/1973 | Wicke .............................. | 137/75 |
| 3,838,705 | A | * | 10/1974 | Diehl et al. ..................... | 137/75 |
| 4,193,416 | A | * | 3/1980 | Slawson .......................... | 137/75 |
| 4,215,749 | A | * | 8/1980 | Dare et al. ..................... | 166/361 |
| 4,412,517 | A | * | 11/1983 | Kobashi et al. .......... | 123/339.26 |
| 4,533,859 | A | * | 8/1985 | Johnstone ..................... | 318/661 |
| 4,535,813 | A | * | 8/1985 | Spain ......................... | 137/625.5 |
| 4,569,503 | A | * | 2/1986 | Karr, Jr. ......................... | 251/14 |
| 4,638,837 | A | * | 1/1987 | Buike et al. ............... | 137/627.5 |
| 4,714,233 | A | | 12/1987 | Oates | |
| 4,732,174 | A | * | 3/1988 | Ueno ....................... | 137/625.38 |
| 4,789,132 | A | | 12/1988 | Fujita et al. | |
| 4,794,309 | A | * | 12/1988 | Saito et al. ....................... | 318/9 |
| 4,948,091 | A | | 8/1990 | Satoh et al. | |

(Continued)

FOREIGN PATENT DOCUMENTS

| DE | 60203984 | 1/2006 |
|---|---|---|
| DE | 60110960 | 4/2006 |

(Continued)

OTHER PUBLICATIONS

International Search Report (Invitation to Pay Additional Fees) for PCT Application No. PCT/US2011/030363 mailed Sep. 5, 2012.

*Primary Examiner* — Craig Schneider
*Assistant Examiner* — David Colon Morales
(74) *Attorney, Agent, or Firm* — Fletcher Yoder P.C.

(57) ABSTRACT

A system, in certain embodiments, includes a gate valve including a gate disposed within a valve body. The gate valve also includes a motorized ball screw actuator having an actuating rod assembly directly coupled to the gate. The motorized ball screw actuator is configured to linearly actuate the actuating rod assembly to drive the gate between an open position and a closed position.

20 Claims, 5 Drawing Sheets

(56) References Cited

U.S. PATENT DOCUMENTS

| | | | |
|---|---|---|---|
| 5,295,907 A * | 3/1994 | Akkerman | 464/37 |
| 5,318,064 A | 6/1994 | Reinicke | |
| 5,499,547 A * | 3/1996 | Nagai et al. | 74/89.34 |
| 5,769,390 A * | 6/1998 | Ando | 251/129.11 |
| 5,803,431 A * | 9/1998 | Hoang et al. | 251/327 |
| 5,832,779 A | 11/1998 | Madrid et al. | |
| 5,983,743 A * | 11/1999 | McGregor et al. | 74/89.23 |
| 5,984,260 A * | 11/1999 | Rawson et al. | 251/71 |
| 6,453,761 B1 | 9/2002 | Babinski | |
| 6,491,062 B1 * | 12/2002 | Croft | 137/624.11 |
| 6,508,592 B1 | 1/2003 | Perni et al. | |
| 6,672,179 B2 | 1/2004 | Borgarelli et al. | |
| 6,708,577 B2 | 3/2004 | Pizzoni et al. | |
| 6,851,648 B2 | 2/2005 | Perni et al. | |
| 6,860,288 B2 * | 3/2005 | Uhler | 137/552 |
| 7,121,379 B2 | 10/2006 | Perni et al. | |
| 7,240,764 B2 | 7/2007 | Perni et al. | |
| 2003/0106386 A1 | 6/2003 | Pacier et al. | |
| 2004/0216888 A1 | 11/2004 | Schmidt et al. | |
| 2005/0000309 A1 | 1/2005 | Perni et al. | |
| 2005/0087029 A1 | 4/2005 | Perni et al. | |
| 2009/0230338 A1 * | 9/2009 | Sanders et al. | 251/129.01 |

FOREIGN PATENT DOCUMENTS

| | | |
|---|---|---|
| EP | 1467124 | 10/2004 |
| EP | 1637772 | 3/2006 |
| EP | 2103830 | 9/2009 |
| ES | 2277664 | 7/2007 |
| ES | 2315631 | 4/2009 |
| GB | 2198766 A | 6/1988 |

* cited by examiner

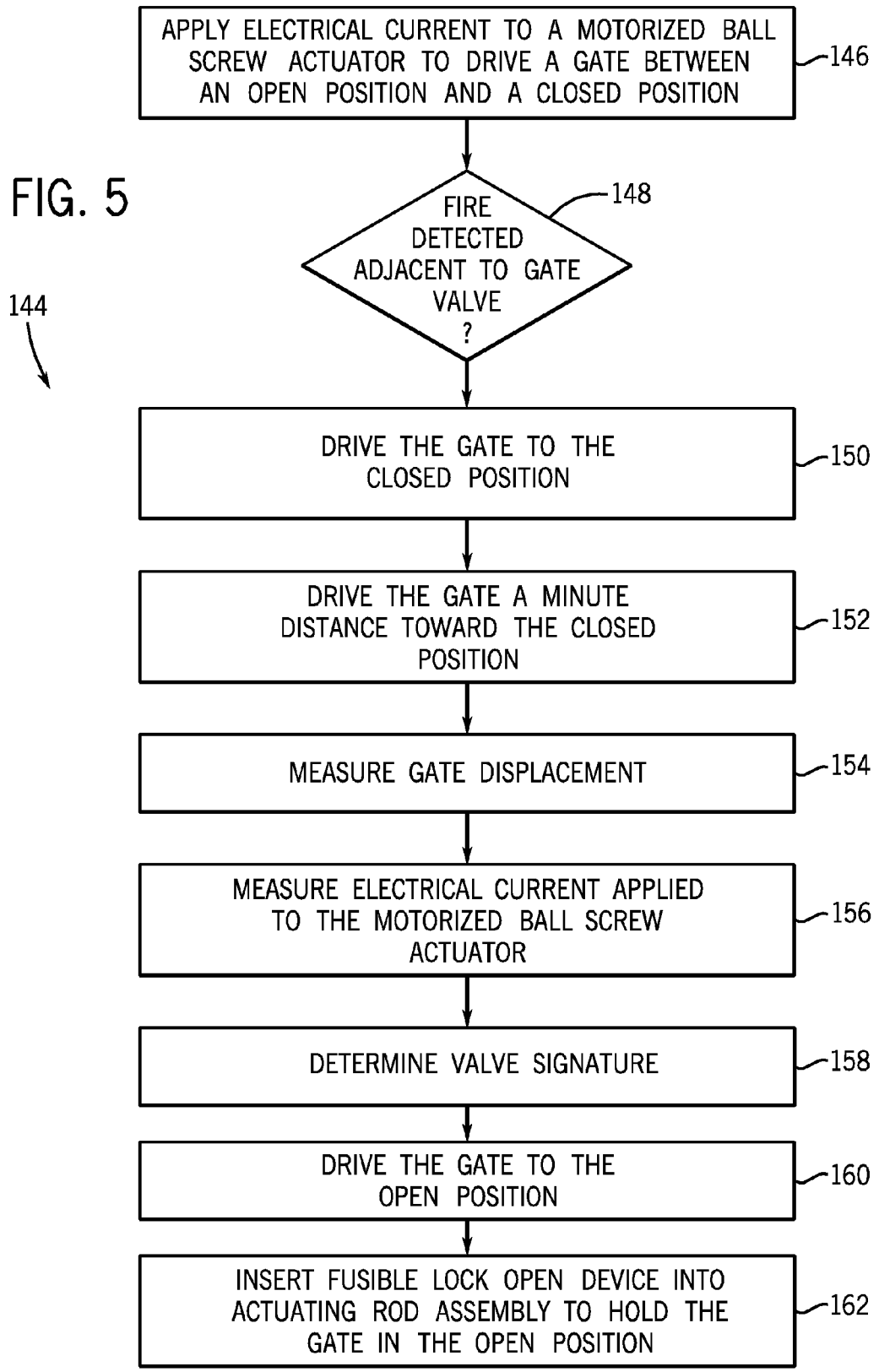

ELECTRONICALLY ACTUATED GATE VALVE

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Once the natural resource is extracted, it is generally transported to processing locations, such as refineries. The transportation of these resources is accomplished through a system of pipelines, which are controlled through various types of valves located at different points throughout the system.

Such extraction systems may include pipelines or other transportation structures to transport the resource from a source, e.g., a well, to a destination such as further transportation systems or storage facilities. Such pipelines or other transportation structures may include pressure control, regulation, safety devices, which may include valves, actuators, sensors, and electronic circuitry. Such devices may be configured to relieve pressure or shut off flow of the resource if a high pressure condition is detected.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 5 is a flow diagram of an exemplary method of operating the gate valve in accordance with certain embodiments of the present technique.

DETAILED DESCRIPTION OF SPECIFIC EMBODIMENTS

Figure 1:
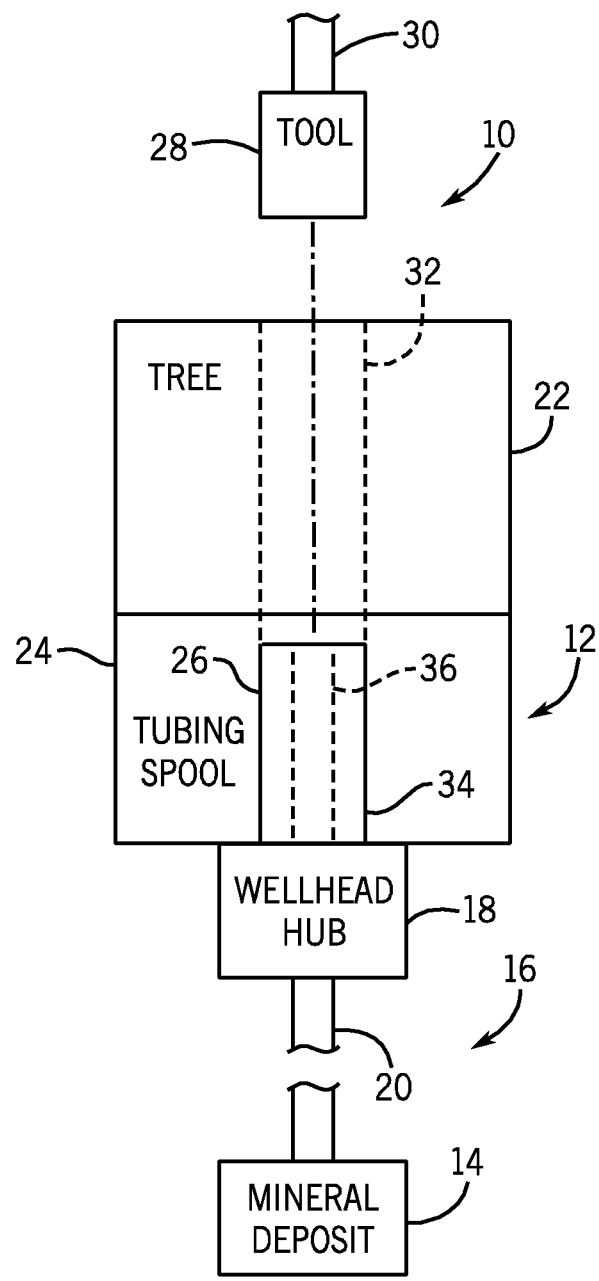
FIG. 1 is a block diagram that illustrates a mineral extraction system in accordance with certain embodiments of the present technique.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

One type of valve that may be utilized in a mineral extraction system is a gate valve. A gate valve includes a gate configured to transition between an open position that facilitates fluid flow through the valve, and a closed position that blocks fluid flow. Certain gate valves include actuators configured to transition the gate between the open and closed positions. As will be appreciated, various actuator configurations may be employed, such as pneumatic, hydraulic, or electromechanical, for example. Certain actuator assemblies include an electric motor mechanically connected to the gate by a series of gears, clutches and/or other components. For example, high speed/low torque alternating current (AC) motors may utilize gearing and/or clutches to establish a force sufficient to drive the gate toward the closed position. Unfortunately, such configurations may be large, complex and expensive to produce due to the components utilized to covert the motor rotation into linear movement of the gate.

Embodiments of the present disclosure may significantly reduce the size, weight, complexity and manufacturing costs associated with electronically actuated gate valves. For example, certain embodiments may employ a motorized ball screw actuator having an actuating rod assembly directly coupled to the gate. In such embodiments, the motorized ball screw actuator linearly translates the actuating rod assembly to drive the gate between an open position and a closed position. Because the actuating rod assembly is linearly driven by the actuator and directly coupled to the gate, the present configuration may obviate the gears, clutches and/or other components utilized to covert motor rotation into linear movement of the gate, thereby significantly reducing the size, weight, complexity and manufacturing costs associated with electronically actuated gate valves. In certain embodiments, the motorized ball screw actuator is configured to drive the gate toward the closed position with sufficient force to sever a conduit extending through a flow path of the valve. Such embodiments may obviate conduit-cutting assemblies separate from the gate valves, thereby further decreasing the size and manufacturing costs of the present gate valve. Furthermore, because the actuating rod assembly is directly coupled to the gate, a valve signature (e.g., relationship between the force applied to the gate and the resultant translation) may be determined by measuring the position of the gate and the force applied to the gate by the motorized ball screw actuator. Such measurements may not be feasible within other electronically actuated gate valves due to the losses associated with the gears and/or clutches.

FIG. 1 is a block diagram that illustrates an embodiment of a mineral extraction system 10. The illustrated mineral extraction system 10 can be configured to extract various minerals and natural resources, including hydrocarbons (e.g., oil and/or natural gas), or configured to inject substances into the earth. In some embodiments, the mineral extraction system 10 is land-based (e.g., a surface system) or subsea (e.g., a subsea system). In the illustrated embodiment, the system 10 includes a wellhead 12 coupled to a mineral deposit 14 via a well 16. The well 16 includes a wellhead hub 18 and a well-bore 20.

The wellhead hub 18 generally includes a large diameter hub that is disposed at the termination of the well bore 20. The wellhead hub 18 provides for the connection of the wellhead 12 to the well 16. In some embodiments, the wellhead 12 includes a connector that is coupled to a complementary connector of the wellhead hub 18. For example, in one embodiment, the wellhead hub 18 includes a DWHC (Deep Water High Capacity) hub manufactured by Cameron, headquartered in Houston, Tex., and the wellhead 12 includes a complementary collet connector (e.g., a DWHC connector), also manufactured by Cameron.

The wellhead 12 typically includes multiple components that control and regulate activities and conditions associated with the well 16. In some embodiments, the wellhead 12 generally includes bodies, valves and seals that route produced minerals from the mineral deposit 14, provide for regulating pressure in the well 16, and provide for the injection of chemicals into the well bore 20 (down-hole). For example, in the illustrated embodiment, the wellhead 12 includes a production tree 22, a tubing spool 24, and a hanger 26 (e.g., a tubing hanger or a casing hanger).

The system 10 may include other devices that are coupled to the wellhead 12, and devices that are used to assemble and control various components of the wellhead 12. For example, in the illustrated embodiment, the system 10 includes a tool 28 suspended from a drill string 30. In certain embodiments, the tool 28 includes a running tool that is lowered (e.g., run) from an offshore vessel to the well 16 and/or the wellhead 12. In other embodiments, such as surface systems, the tool 28 may include a device suspended over and/or lowered into the wellhead 12 via a crane or other supporting device.

The tree 22 generally includes a variety of flow paths (e.g., bores), valves, fittings, and controls for operating the well 16. For instance, in some embodiments, the tree 22 includes a frame that is disposed about a tree body, a flow-loop, actuators, and valves. Further, the tree 22 generally provides fluid communication with the well 16. For example, in the illustrated embodiment, the tree 22 includes a tree bore 32. The tree bore 32 provides for completion and workover procedures, such as the insertion of tools (e.g., the hanger 26) into the well 16, the injection of various chemicals into the well 16 (down-hole), and the like. Further, minerals extracted from the well 16 (e.g., oil and natural gas) are generally regulated and routed via the tree 22. For instance, the tree 22 may be coupled to a jumper or a flowline that is tied back to other components, such as a manifold. Accordingly, in such an embodiment, produced minerals flow from the well 16 to the manifold via the wellhead 12 and/or the tree 22 before being routed to shipping or storage facilities.

The tubing spool 24 provides a base for the wellhead 12 and/or an intermediate connection between the wellhead hub 18 and the tree 22. Typically, the tubing spool 24 (also referred to as a tubing head) is one of many components in a modular subsea or surface mineral extraction system 10 that are run from an offshore vessel and/or a surface installation system. As illustrated, the tubing spool 24 includes a tubing spool bore 34. The tubing spool bore 34 connects (e.g., enables fluid communication between) the tree bore 32 and the well 16. Thus, the tubing spool bore 34 provides access to the well bore 20 for various completion procedures, worker procedures, and the like. For example, components can be run down to the wellhead 12 and disposed in the tubing spool bore 34 to seal-off the well bore 20, to inject chemicals down-hole, to suspend tools down-hole, and/or to retrieve tools from down-hole.

The illustrated hanger 26 (e.g., tubing hanger or casing hanger), for example, is typically disposed within the wellhead 12 to secure tubing and casing suspended in the well bore 20, and to provide a path for hydraulic control fluid, chemical injections, and the like. The hanger 26 includes a hanger bore 36 that extends through the center of the hanger 26, and that is in fluid communication with the tubing spool bore 34 and the well bore 20. The mineral extraction system 10 may include plugs and valves which are employed to regulate the flow and pressures of fluids in various bores and channels throughout the mineral extraction system 10. For example, a valve may be included in the tree 22 and/or regulate flow between the wellhead hub 18 and the mineral deposit 14. In some embodiments, these valves may include a gate valve having a motorized ball screw actuator, such as the one described in detail below. Embodiments of the present gate valve may be smaller, less expensive to produce and less complex than gate valves employing other electronic actuators.

Figure 2:
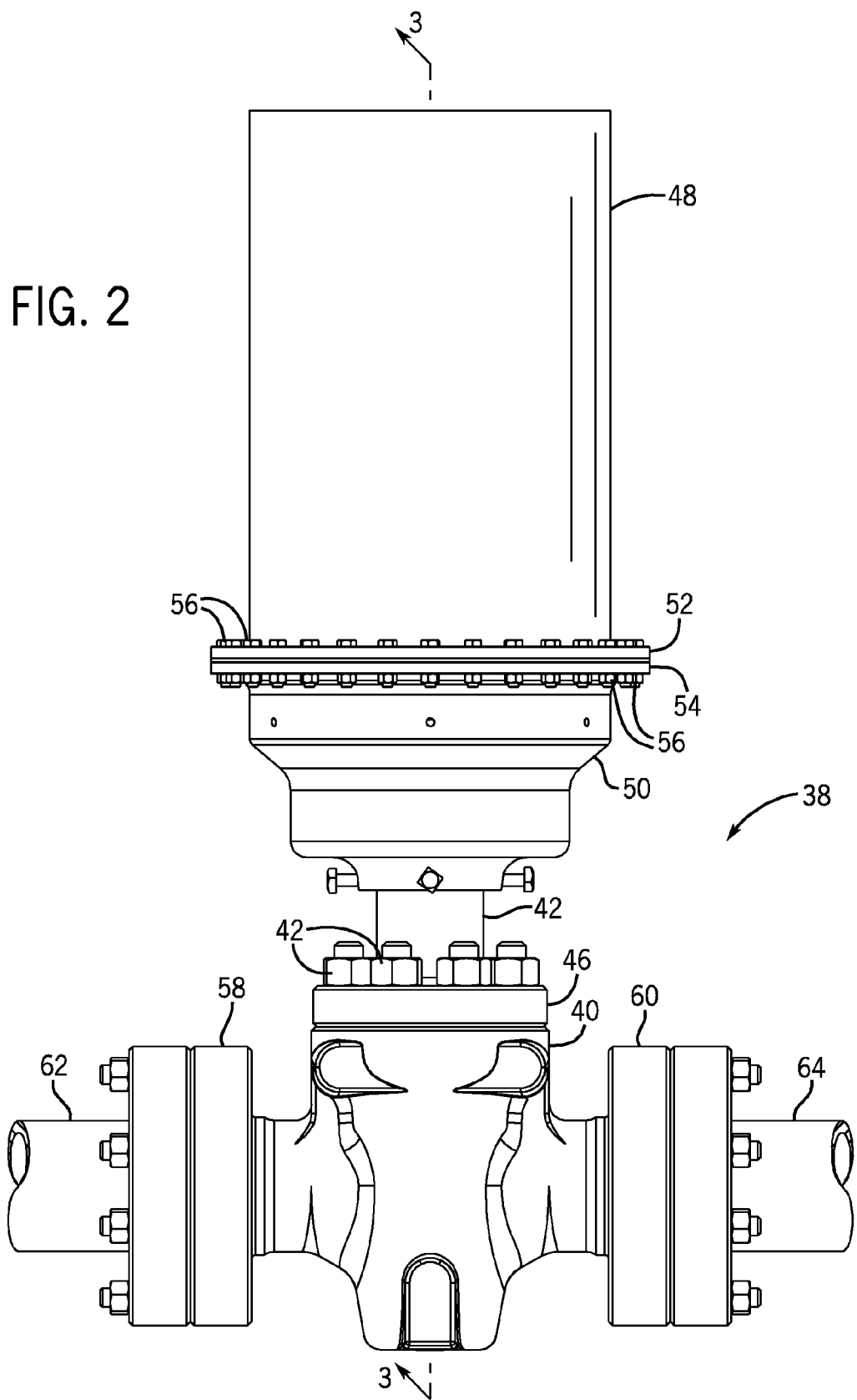
FIG. 2 is a front view of an exemplary gate valve that may be utilized within the mineral extraction system shown in FIG. 1 in accordance with certain embodiments of the present technique.

FIG. 2 is a front view of an exemplary gate valve 38 that may be utilized within the mineral extraction system 10 shown in FIG. 1. As illustrated, the gate valve 38 includes a valve body 40 coupled to a valve bonnet 42 by fasteners, such as the illustrated bolts 44. Specifically, the bolts 44 pass through a flange 46 of the bonnet 42 and into the body 40, thereby securing the body 40 to the bonnet 42. As discussed in detail below, the gate valve 38 is actuated by a motorized ball screw actuator 48. Specifically, the motorized ball screw actuator 48 includes an actuating rod assembly directly coupled to a gate which regulates flow through the valve 38. The motorized ball screw actuator 48 is configured to linearly translate the actuating rod assembly to drive the gate between an open position that facilitates flow through the valve 38, and a closed position that blocks fluid flow. As illustrated, the motorized ball screw actuator 48 is coupled to the bonnet 42 by a housing 50. As discussed in detail below, the housing 50 contains a spring configured to bias the gate toward the closed position. In such a configuration, the gate will automatically transition to the closed position upon a loss of electrical power. Consequently, the present valve 38 may be known as a fail safe closed valve because the valve 38 closes in response to an electrical or mechanical failure of the actuator 48. The motorized ball screw actuator 48 includes a flange 52 which couples to a corresponding flange 54 of the housing 50 by multiple fasteners, such as the illustrated bolts 56, thereby securing the actuator 48 to the housing 50.

The valve 38 includes an inlet passage 58 and an outlet passage 60 to facilitate connection to piping or other components. For example, the valve 38 may be placed between an upstream pipe 62 transporting a fluid from a source and a downstream pipe 64 transporting the fluid to downstream equipment. In such an embodiment, the valve 38 may be employed to selectively block and enable flow from the upstream pipe 62 through the valve 38 and into the downstream pipe 64. In other embodiments, the valve 10 may be used to regulate (e.g., choke) flow from the upstream pipe 62 into the downstream pipe 64.

As discussed in detail below, because the motorized ball screw actuator 48 is capable of directly translating the gate between the open position and the closed position, the present embodiment may obviate gears, clutches and/or other components configured to transfer rotation of the electronic actuator into linear movement of the gate. By omitting the additional components, the present gate valve 38 may be smaller, less complex and less expensive to produce than designs employing gears, clutches and/or other components. In addition, the present motorized ball screw actuator 48 is capable of driving the gate toward the closed position with sufficient force for the gate to sever a conduit extending through a bore of the valve 38. Consequently, the present embodiment may obviate separate conduit-cutting devices (e.g., springs), thereby further reducing the size, complexity and manufacturing cost of the gate valve 38. Furthermore, as discussed in detail below, the present valve 38 may include a controller configured to compute a valve signature (e.g., relationship between the force applied to the gate and the distance the gate translates) by measuring force applied by the actuator 48 to the gate and the resultant gate movement. In further embodiments, the controller may be configured to detect a fire adjacent to the valve 38, and to instruct the actuator 48 to close the gate in response to the detected fire.

Figure 3:
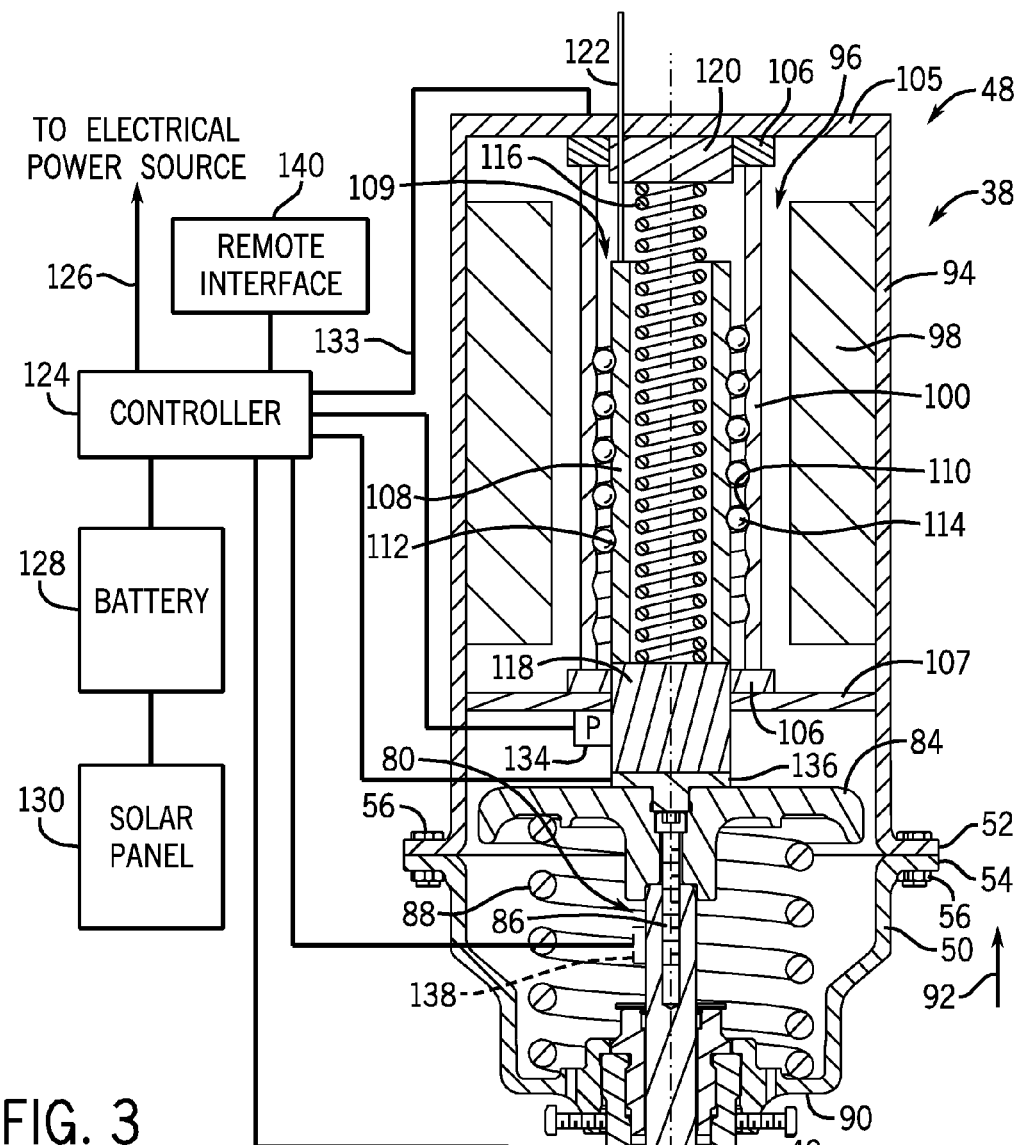
FIG. 3 is a cross-sectional view of the gate valve, taken along line 3-3 of FIG. 2, illustrating a motorized ball screw actuator having an actuating rod assembly directly coupled to a gate within a valve body in accordance with certain embodiments of the present technique.

FIG. 3 is a cross-sectional view of the gate valve 38, taken along line 3-3 of FIG. 2, illustrating the motorized ball screw actuator 48 having an actuating rod assembly directly coupled to a gate within the valve body 40. As illustrated, the valve body 40 includes a flow path 66 extending between the inlet passage 58 and the outlet passage 60. A gate 68 is positioned within the flow path 66 to selectively block and enable a flow of fluid through the flow path 66. As illustrated, the gate 68 is in a closed position which blocks the flow of fluid through the valve 38. In the present embodiment, the valve body 40 includes a seal 70 on both an upstream side and a downstream side of the gate 68. The seals 70 are configured to block a flow of fluid around the gate 68. The gate 68 may be transitioned toward the open position by translation in a direction 72 along a longitudinal axis 74 of the valve 38. In the present configuration, the longitudinal axis 74 extends along an axial direction 75. Consequently, downward movement of the gate 68 along the axial direction 75 transitions the gate 68 toward the open position. Specifically, the gate 68 includes an opening 76 which enters the flow path 66 as the gate 68 moves in the downward direction 72. When the opening 76 is aligned with the flow path 66, the valve 38 is in an open position that facilitates flow through the valve 38. To facilitate movement in the downward direction 72, the valve body 40 includes a recess 78 at the lower axial extent of the body 40 to capture a solid portion 79 of the gate 68.

In the present embodiment, the gate 68 is directly coupled to an actuating rod assembly 80. As discussed in detail below, the actuating rod assembly 80 is driven to move in the axial direction 75 along the longitudinal axis 74 by the motorized ball screw actuator 48. Because no gears, clutches or other components are employed to couple the motorized ball screw actuator 48 to the gate 68, the valve 38 may be smaller and less expensive to manufacture than valve configurations which utilize gears and/or clutches, for example. In addition, without the mechanical losses associated with gears and/or clutches, the efficiency of the present embodiment may be significantly greater than configurations which employ such components. As illustrated, the actuating rod assembly 80 includes a stem 82 and a spring plate 84, as well as other components described below. The stem 82 is coupled to the gate 68, and the spring plate 84 is coupled to the stem 82. Specifically, a bolt 86 is disposed through an opening within the spring plate 84 and coupled to the stem 82 by a threaded connection, for example. Consequently, the actuator 48 is arranged in-line with the gate 68 along the longitudinal axis 74. As the motorized ball screw actuator 48 drives the spring plate 84 in the downward direction 72, coupling between the spring plate 84 and the stem 82 drives the stem 82 downward, thereby transitioning the gate 68 toward the open position.

In the present configuration, the gate 68 is biased toward the closed position by a compression spring 88 disposed within the housing 50. As illustrated, the spring 88 extends between the spring plate 84 and a bottom portion 90 of the housing 50. In this configuration, the spring 88 applies a force to the spring plate 84 in a direction 92 along the longitudinal axis 74 of the valve 38. Because the spring plate 84 is coupled to the gate 68 via the stem 82, the spring 88 biases the gate 68 toward the closed position. To transition the gate 68 toward the open position, the motorized ball screw actuator 48 applies a downward force in the direction 72 sufficient to overcome the bias of the spring 88. Conversely, the motorized ball screw actuator 48 may transition the gate 68 toward the closed position by back-driving the actuating rod assembly 80 in the direction 92. However, due to the spring bias, if an electrical or mechanical failure disables the motorized ball screw actuator 48, the spring 88 will automatically drive the gate 68 to the closed position. Consequently, the present valve 38 may be considered a failsafe closed configuration because the valve 38 will automatically close in response to an actuator failure. Furthermore, in the present configuration, if the actuator 48 is removed from the valve 38 for maintenance operations, the gate 68 will remain in the closed position.

As previously discussed, the motorized ball screw actuator 48 is mounted to the housing 50 by the flanges 52 and 54, and the bolts 56. As illustrated, the motorized ball screw actuator 48 includes an outer casing 94 and a permanent magnet, direct current (DC) motor 96. As will be appreciated, permanent magnet, DC motors may provide sufficient torque to drive the actuating rod assembly 80 in the direction 72 against the force of the spring 88 to transition the gate 68 to the open position. In addition, such motor configurations may be smaller, less expensive, and less complex to control than alternative motor designs. However, in alternative embodiments, other motors may be employed, such as synchronous alternating current (AC) motors, or induction motors, for example.

The present permanent magnet, DC motor 96 includes a stator 98 and a rotor 100. Both the stator 98 and the rotor 100 extend about the actuator 48 along a circumferential direction 102. As illustrated, the stator 98 is coupled to the casing 94 and the rotor 100 is positioned inward from the stator 98 along a radial direction 104. While the stator 98 is fixed relative to the actuator 48, the rotor 100 is allowed to rotate about the longitudinal axis 74 in the circumferential direction 102. In the present configuration, the rotor 100 is coupled to a top portion 105 of the casing 94 and a bottom portion 107 of the casing 94 by respective bearings 106. The bearing facilitate rotation of the rotor 100 about the longitudinal axis 74, while limiting translation in the axial direction 75. In the present embodiment, the stator 98 is a permanent magnet and the rotor 100 is an electromagnet winding. However, in alternative embodiments, the rotor 100 may be a permanent magnet, and the stator 98 may be an electromagnet winding.

In the present configuration, the rotor 100 serves as a nut (e.g., female threads) of a ball screw assembly 109, while a shaft 108 of the actuating rod assembly 80 serves as the screw (e.g., male threads). Consequently, rotation of the rotor/nut 100 in the circumferential direction 102 drives the shaft/screw 108 downward in the direction 72 along the longitudinal axis 74. As illustrated, the rotor/nut 100 includes a series of grooves 110 extending along the axial direction 75. The shaft/screw 108 includes a similar series of grooves 112 approximately axially aligned with the grooves 110 of the rotor/nut 100. Ball bearings 114 are positioned within the grooves 110 and 112. As will be appreciated, each groove 110 and 112 forms a spiral raceway extending around the circumference and down the longitudinal axis of the rotor 100 and shaft 108. The relative angle of the shaft raceway to the rotor raceway defines the degree of axial movement of the shaft 108 per degree of rotor rotation. For example, a relatively small difference in raceway angle will result in relatively small axial movement of the shaft 108 per degree of rotation of the rotor 100. Conversely, a relatively large difference in raceway angle will result in relatively large axial movement of the shaft 108 per degree of rotation of the rotor 100. In addition, the raceway angle difference affects the force applied by the shaft 108. Specifically, smaller raceway angle differences result in larger forces applied by the shaft 108 for a given torque generated by the motor 96. As will be further appreciated, the ball bearings 114 serve to reduce friction between the grooves 110 and 112, thereby facilitating rotation of the rotor 100 even when a large axial force is applied to the shaft 108.

In the present configuration, an internal tension spring 116 extends between an intermediate rod 118 of the actuating rod assembly 80 and a base plate 120. As illustrated, the base plate 120 is coupled to the top portion 105 of the outer casing 94, and the spring 116 is coupled to the base plate 120. In addition, the spring 116 and shaft 108 are coupled to the intermediate rod 118, which serves to connect the shaft 108 to the remainder of the actuating rod assembly 80. In this configuration, the spring 116 serves to further bias the gate 68 toward the closed position. Specifically, the internal tension spring 116 urges the intermediate rod 118 in the upward axial direction 92, thereby biasing the actuating rod assembly 80 upward. In alternative embodiments, the spring 116 may be omitted, and the compression spring 88 may serve to bias the gate 68 toward the closed position alone. In further embodiments, a torsion spring may extend between the rotor 100 and the casing 94 to circumferential bias the rotor 100 to drive the gate 68 toward the closed position.

As a result of the direct coupling between the actuating rod assembly 80 and the gate 68, the motorized ball screw actuator 48 may linearly drive the gate 68 between the open position and the closed position. Specifically, to drive the gate 68 toward the open position from the presently illustrated closed position, an electrical current may be applied to the motor 96, thereby inducing the rotor 100 to rotate about the longitudinal axis 74 of the gate valve 38. As the rotor 100 rotates, interaction between the raceways of the ball screw assembly 109 drives the shaft 108 to translate downward in the direction 72. Because the shaft 108 is an element of the actuating rod assembly 80 (including the intermediate shaft 118, the spring plate 84, and the stem 82), movement of the shaft 108 induces a corresponding movement of the gate 68. As previously discussed, movement of the gate 68 in the direction 72 transitions the opening 76 into alignment with the flow path 66, thereby facilitating fluid flow through the valve 38.

Conversely, an electrical current may be applied to the motor 96 inducing the rotor 100 to rotate in an opposite circumferential direction 102, thereby inducing the shaft 108 to translate in the upward direction 92. Because the shaft 108 is an element of the actuating rod assembly 80 (including the intermediate shaft 118, the spring plate 84, and the stem 82), movement of the shaft 108 induces a corresponding movement of the gate 68. As previously discussed, movement of the gate 68 in the direction 92 transitions the opening 76 out of alignment with the flow path 66, thereby blocking fluid flow through the valve 38. Because the present motorized ball screw actuator 48 is capable of directly driving the gate 68 between the open and closed positions, no gears, clutches, levers, or other components may be disposed between the actuator 48 and the gate 68. Consequently, the present valve 38 may be smaller, lighter, less expensive to produce, more efficient and more reliable than valves employing electronic actuators which utilizes gears, clutches, or levers to couple the actuator to the gate.

In the present configuration, a visual indicator 122 extends from the shaft 108 through the casing 94. With the gate 68 in the illustrated closed position, the visual indicator 122 extends in the upward axial direction 92 from the top portion 105 of the casing 94. However, as the actuator 48 transitions the gate 68 toward the closed position, coupling between the visual indicator 122 and the shaft 108 causes the indicator 122 to move axially downward in the direction 72. Once the gate 68 is in the closed position, the visual indicator 122 will no longer extend from the casing 94. Consequently, an operator may readily determine the position of the gate 68 by a visual inspection of the indicator 122. However, in alternative embodiments, the visual indicator 122 may be omitted and the position of the gate 68 may be determined by other features (e.g., electronic position measurement).

The present embodiment employs a controller 124 to regulate the motor 96 of the motorized ball screw actuator 48. As illustrated, the controller 124 is coupled to an electrical power source via an electrical conduit 126. In certain embodiments, the controller 124 may include certain electrical circuits configured to convert the current from the electrical power source to a form usable by the motorized ball screw actuator 48. For example, the electrical conduit 126 may be coupled to electrical mains which carry AC current. As previously discussed, the actuator 48 may employ a permanent magnet, DC motor 96. Consequently, the controller 124 may convert the AC current from the power source to DC current for the motor 96. In addition, the controller 124 may be configured to reverse the polarity of the current supplied to the motor 96 to regulate the direction of rotation. For example, a first polarity may be applied to the motor 96 to induce the actuator 48 to drive the gate 68 toward the closed position, and a second polarity, opposite from the first polarity, may be applied to the motor 96 to induce the actuator 48 to drive the gate 68 toward the open position.

In certain embodiments, a battery 128 may be coupled to the controller 124 to provide power to the actuator 48 in the event of a current interruption from the power source. For example, the controller 124 may be configured to automatically instruct the actuator 48 to drive the gate 68 toward the closed position in the event of an electrical interruption. In such a configuration, the battery 128 may be configured to contain sufficient energy to facilitate such an emergency shut down operation. In addition, the battery 128 may be coupled to a solar panel 130 which provides electrical power to the battery 128 to maintain the battery 128 in a fully charged condition until utilized. In alternative embodiments, the battery 128 and solar panel 130 may have sufficient capacity to drive the actuator 48 without the electrical power source. Consequently, in such embodiments, the valve 38 may be positioned in remote locations without the additional expense of running an electrical conduit 126. In further embodiments, a capacitor bank may be employed in place of the battery 128 to power the actuator 48.

In certain embodiments, the controller 124 is configured to detect the presence of a fire adjacent to the valve 38, and to instruct the actuator 48 to close the gate 68 if a fire or elevated temperature is detected. As illustrated, a sensor 132 is coupled to the valve body 40 and configured to send a signal to the controller 124 indicative of a fire adjacent to the gate valve 38. For example, the sensor 132 may be a thermocouple, a smoke detector, an optical flame sensor, or other sensor configured to detect the presence of a fire. In addition, the sensor 132 may be positioned within other areas of the valve 38, such as the bonnet 42 or the housing 50, among other areas. The controller 124 is configured to receive the signal from the sensor 132, and determine whether a fire is present based on the signal.

In one exemplary embodiment, the sensor 132 is a thermocouple configured to send a signal to the controller 124 indicative of the valve temperature. In such an embodiment, the controller 124 may be configured to identify a fire (or undesirable heat level) based on the valve temperature and a duration associated with that temperature. For example, the controller 124 may identify a fire if the temperature of the valve 38 is greater than 1000 degrees Fahrenheit for longer than six minutes. As will be appreciated, the controller 124 may be configured to identify a fire if a higher temperature is detected for a shorter duration, or a lower temperature is detected for a longer duration. Furthermore, alternative embodiments may employ other temperature and/or duration ranges. For example, the controller 124 may identify a fire if a temperature of greater than 300, 400, 500, 600, 800, 1000, 1200, 1400, 1600, 2000 degrees Fahrenheit, or more is detected for a duration of 0, 0.25, 0.5, 1, 2, 3, 4, 5, 6, 8, 10 minutes, or more. If the controller 124 detects a fire, the controller 124 will instruct the actuator 48 to close the gate 68, thereby blocking flow of potentially flammable fluid through the valve 38. In certain embodiments, a conduit 133 extending between the controller 124 and the actuator 148 may run past the valve body 40 such that a fire adjacent to the valve body 40 may sever the conduit 133. If the conduit 133 is severed, electrical power to the actuator 48 will be terminated. Consequently, the springs 88 and/or 116 will urge the gate 68 to the closed position. Routing the conduit 133 past the valve body 40 may be employed alone or in conjunction with the fire detection system described above. However, it should be appreciated, that the sensor 132 may be capable of detecting the presence of a fire earlier than the conduit-severing configuration.

In certain embodiments, the controller 124 may be configured to determine a signature of the valve 38. As will be appreciated, valve signature may be defined as a relationship between the force applied to the gate 68 and the distance the gate 68 translates. Variation in valve signature from an expected force/distance relationship may be indicative of a worn or malfunctioning valve 38. For example, if the controller 124 detects that a relatively large force is applied to move the gate 68 a relatively short distance, the controller 124 may determine that the valve 38 is not operating properly.

The present gate valve 38 includes a position sensor 134 communicatively coupled to the controller 124 to measure the position of the gate 68. In the present configuration, the position sensor 134 is coupled to the bottom portion 107 of the actuator casing 94. The position sensor 134 is configured to monitor the position of the intermediate rod 118 relative to the actuator casing 94. Because the intermediate rod 118 is part of the actuating rod assembly 80 and the actuating rod assembly 80 is directly coupled to the gate 68, measuring the position of the intermediate rod 118 effectively determines the position of the gate 68. However, in alternative embodiments, the position sensor 134 may be located in other areas of the valve 38. For example, the position sensor 134 may measure linear displacement of the spring plate 84, the shaft 108, the stem 82 or the gate 68, for example. In further embodiments, the position sensor 134 may measure rotation of the rotor 100. As previously discussed, because the rotor 100 is coupled to the shaft 108 via the ball screw assembly 109, rotation of the rotor 100 is directly translated into linear displacement of the shaft 108. For example, in one embodiment, the position sensor 134 may be a Hall effect sensor configured to monitor the magnetic field of the rotor 100 to determine rotor rotation.

A variety of force sensors may be employed to determine the force applied by the actuator 48 to the gate 68. For example, the present embodiment includes a load cell 136 and a strain gauge 138. As will be appreciated, other force sensing devices may be employed in alternative embodiments. In the present configuration, the load cell 136 is positioned between the intermediate rod 118 and the spring plate 84 within the actuating rod assembly 80. In this position, the load cell 136 measures the compression of the actuating rod assembly 80, thereby measuring the force on the gate 68. As will be appreciated, the load cell 136 may be positioned within another portion of the actuating rod assembly 80, such as between the spring plate 84 and the stem 82, for example. In further embodiments, the load cell 136 may be positioned between the stem 82 and the gate 68. Similarly, the strain gauge 138 is disposed against the stem 82 to measure strain within the actuating rod assembly 80, thereby measuring force acting on the gate 68. As will be appreciated, the strain gauge 138 may be coupled to alternative components of the actuating rod assembly 80, such as the intermediate rod 118 or the spring plate 84, for example. While the strain gauge 138 and the load cell 136 are both employed in the present embodiment, it should be appreciated that alternative embodiments may include only one force measuring device (e.g., load cell 136 or stain gauge 138).

In alternative embodiments, the force applied to the gate 68 may be determined by measuring the torque of the motor 96. As will be appreciated, current draw from an electric motor, such as the permanent magnet, DC motor 96, is related to the torque applied by the motor. Consequently, the controller 124 may be configured to measure the current applied to the motor 96, and compute a torque based on the measured current. Based on the angle difference between the racetracks of the ball screw assembly 109, the force applied by the actuating rod assembly 80 may be determined by the computed torque. Therefore, the controller 124 may determine the force applied to the gate 68 without input from an external sensors. As will be appreciated, determining force in this manner may not be possible in electronically actuated valve configurations which employ gears and/or clutches due to the unknown loss associated with these components.

While the valve signature may be determined during operation of the valve 38, it may also be desirable to test valve functionality while the gate 68 is in the open position. For example, the controller 124 may send a signal to the actuator 48 instructing the actuator 48 to transition the gate 68 a minute distance in the axially downward direction 72. The distance may be particularly selected such that the flow rate of fluid through the passage 66 is substantially unaffected. For example, the distance may be less than approximately 0.6, 0.5, 0.4, 0.3, or 0.2 inches, or less. As the gate 68 moves in the downward direction 72, the position of the gate 68 will be measured by the position sensor 134 and the force applied by the actuator 48 will be measured by the load cell 136, the strain gauge 138 and/or the current applied to the motor 96. Using the position and force information, the controller 124 may compute the valve signature to determine whether the valve 38 is operating properly. Once the test is complete, the controller 124 will instruct the actuator 48 to transition the gate 68 back to the open position.

In certain embodiments, a remote interface 140 may be communicatively coupled to the controller 124 to facilitate communication with a remote operator. The remote interface 140 may transmit valve position based on a signal from the position sensor 134 to the remote operator such that the position of each valve 38 may be monitored. In addition, the remote interface 140 may enable the operator to control valve operation (e.g., opening and closing the gate 68) from a remote location. Such a configuration may significantly reduce the duration associated with reconfiguring the valves of a wellhead 12, for example.

Figure 4:
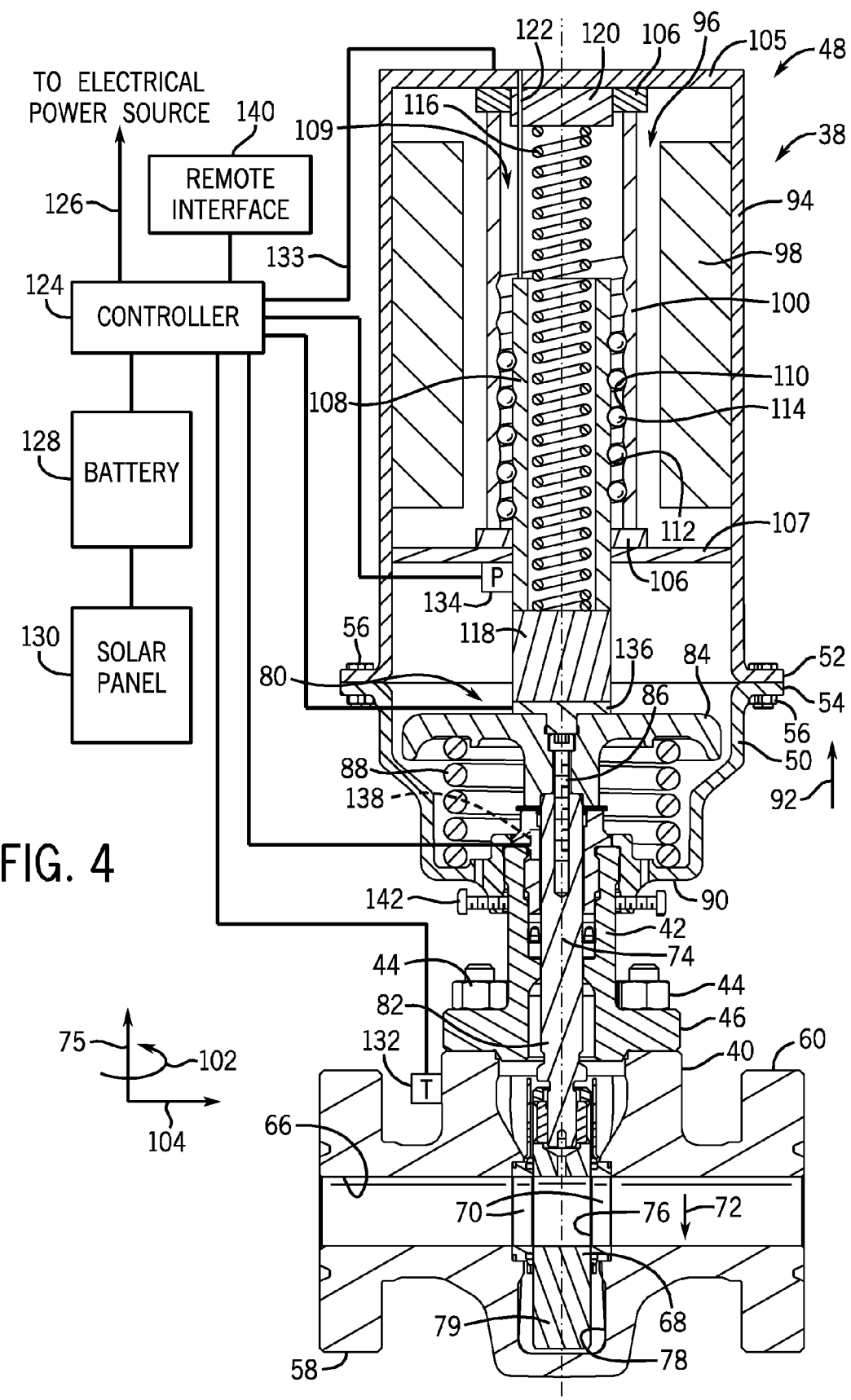
FIG. 4 is a cross-sectional view of the gate valve, as shown in FIG. 3, illustrating the gate in an open position in accordance with certain embodiments of the present technique.

FIG. 4 is a cross-sectional view of the gate valve 38, as shown in FIG. 3, illustrating the gate 68 in an open position. As previously discussed, transitioning the gate 68 to the open position aligns an opening 76 with the flow path 66, thereby enabling fluid to flow through the valve 38. In the present embodiment, the motorized ball screw actuator 48 drives the gate 68 in the direction 72 to transition the gate 68 toward the open position. Specifically, the controller 124 instructs the motor 96 within the actuator 48 to rotate in the circumferential direction 102, thereby driving the shaft 108 to translate in the direction 72. Because the shaft 108 is an element of the actuating rod assembly 80 and the actuating rod assembly 80 is directly coupled to the gate 68, movement of the shaft 108 in the direction 72 induces the gate 68 to transition toward the open position. As previously discussed, the recess 78 accommodates the solid portion 79 of the gate 68 while the gate 68 is in the open position.

The motorized ball screw actuator 48 is configured to hold the gate 68 in the open position with substantially less current draw than electronically actuated valve configurations that employ a solenoid to maintain the gate in the open position. As will be appreciated, configurations which utilize a solenoid to block movement of the gate toward the closed position continuously draw current, thereby demanding large amounts of electrical power. In contrast, a substantially lower current draw may be utilized by the motorized ball screw actuator 48 to hold the gate 68 in the open position against the spring bias. As a result, the valve 38 will consume less electrical power than embodiments that employ a solenoid, thereby resulting in lower operational costs. Furthermore, in certain embodiments, the battery 128 may provide sufficient electrical power to the actuator 48 for the actuator 48 to hold the gate 68 in the open position without the electricity supplied by the electrical power source. Such a configuration, in combination with the solar panel 130, may enable the valve 38 to operate in locations remote from electrical power mains.

The present embodiments are configured to close the gate 68 rapidly while maintaining the structural integrity of the gate 68 and valve body 40. Specifically, the controller 124 may regulate the speed at which the gate 68 translates in the direction 92 to limit the contact forces between various components of the valve 38 (e.g., gate 68, valve body 40, etc.). In certain configurations, the motorized ball screw actuator 48 may be capable of transitioning the gate 68 to the closed position within approximately 10, 9, 8, 7, 6, 5 seconds, or less, while substantially maintaining the structural integrity of the gate 68 and the valve body 40. In contrast, alternative electronic actuators (e.g., AC motors coupled to the gate by gears and/or clutches) may close the gate 68 within approximately 30 seconds, or longer, due to inaccurate control of the driving motor. Consequently, the gate 68 of the present embodiment may be repeatedly closed quickly, while maintaining the functionality of the valve 38.

Because the actuating rod assembly 80 is directly coupled to the gate 68, the gate 68 may be driven from the open position to the closed position by reversing the direction of rotation of the motor 96. For example, the controller 124 may drive the motor 96 in the opposite circumferential direction 102, thereby inducing the gate 68 to translate in the direction 92. In certain configurations, the motor 96 may be configured to apply a sufficient torque to the ball screw assembly 109 to drive the gate 68 toward the closed position even if a conduit is present within the flow path 66. For example, in certain embodiments, the valve 38 may be utilized to regulate flow through a well bore 20. In such embodiments, various conduits may be inserted through the flow path 66 to access down hole structures. For example, continuous coil tubing may be inserted through the well bore 20 to facilitate certain secondary recovery techniques. If a fire develops adjacent to the wellhead 12, the valve 38 may be quickly closed to isolate the fire. In such a situation, there may be insufficient time for the conduit to be extracted from the well bore 20 prior to closing the valve 38. Consequently, the gate 68 may be closed with sufficient force to sever the conduit. For example, the actuator 48 may be configured to provide sufficient force for the gate 68 to cut a conduit having a diameter greater than approximately 0.25, 0.5, 0.75, 1 inch, or more. Therefore, the actuator 48 may apply a force in the direction 92 of greater than approximately 8,000, 12,000, 20,000, 30,000, 40,000 pounds, or more. Because the motorized ball screw actuator 48 is capable of driving the gate 68 with sufficient force to sever the conduit, additional wire-cutting devices (e.g., powerful springs configured to force the gate to cut the conduit) may be omitted, thereby reducing the size, cost and complexity of the valve 38.

The present embodiment also includes a fusible lock-open device 142 configured to support actuator maintenance operations. As previously discussed, the springs 88 and/or 116 are configured to bias the gate 68 toward the closed position. Consequently, if the actuator 48 is removed for maintenance, the gate 68 will automatically transition to the closed position, thereby blocking flow through the fluid passage 66. However, it may be desirable to maintain the valve 38 in the open position during actuator maintenance operations, thereby maintaining flow through the passage 66. Therefore, while the gate 68 is in the illustrated open position, the fusible lock-open device 142 may be inserted into the actuating rod assembly 80 prior to deactivation of the actuator 48. Contact between the fusible lock-open device 142 and an outer surface of the valve 38 blocks movement of the gate 68 toward the closed position, thereby maintaining the valve 38 in the open position.

In the present embodiment, the fusible lock-open device 142 is a bolt inserted through the housing 50 into the stem 82. However, it should be appreciated that alternative fusible lock-open devices may be inserted through the bonnet 42 or the valve body 40, for example. In addition, while the fusible lock-open device 142 engages the stem 82 in the present embodiment, it should be appreciated that the device 142 may engage other areas of the actuating rod assembly 80, such as the spring plate 82 or the intermediate rod 118, for example. Furthermore, while the present fusible lock-open device 142 is a bolt, it should be appreciated that alternative devices such as pins, clamps or other structures configured to hold the gate 68 in the open position may be employed.

In the present embodiment, the fusible lock-open device 142 is configured to disengage the actuating rod assembly 80 in the event of a fire adjacent to the valve 38. For example, the illustrated bolt may be composed of a plastic (e.g., polytetrafluoroethylene) that melts in the presence of a fire. As the fusible lock-open device 142 melts, it disengages the actuating rod 80, thereby enabling the biasing force from the springs 88 and/or 116 to drive the gate 68 toward the closed position. In this manner, the fire may be isolated, thereby substantially maintaining the integrity of the valve 38. As will be appreciated, alternative embodiments may employ other fusible lock-open devices 142 configured to disengage the actuating rod assembly 80 in the event of a fire adjacent to the valve 38.

FIG. 5 is a flow diagram of an exemplary method 144 of operating the gate valve 38. First, as represented by block 146, an electrical current is applied to the motorized ball screw actuator 48 to drive the gate 68 between the open position and the closed position. As previously discussed, the electrical current powers the motor 96 which rotates to drive the actuating rod assembly 80 in the axial direction 75, thereby transitioning the gate 68 to the open or closed position. Due to direct coupling between the actuating rod assembly 80 and the gate 68, the actuator 48 may drive the gate 68 toward the closed position within approximately 10, 9, 8, 7, 6, 5 seconds, or less, while substantially maintaining the structural integrity of the gate 68 and the valve body 40. In addition, the actuator 48 may apply sufficient force to the gate 68 for the gate 68 to sever a conduit extending through the flow path 66. Furthermore, due to the direct coupling between the actuator 48 and the gate 68, the valve 38 may be smaller, lighter and less expensive to produce than valve configurations employing clutches, gears and/or other components between the actuator 48 and the gate 68.

Next, as represented by blocks 148 and 150, if a fire is detected adjacent to the valve 38, the actuator 48 will drive the gate 68 to the closed position. As previously discussed, a sensor 132 positioned adjacent to the valve 38 may send a signal to the controller 124 indicative of a fire. If the controller 124 determines that a fire is present based on a set of desired fire detection criteria, the controller 124 may instruct the actuator 48 to transition the gate 68 to the closed position. Based on the desired fire detection criteria, the controller 124 may be able to detect the presence of a fire earlier than the cable-severing configuration described above. Consequently, present embodiments may be able to substantially maintain the structural integrity of the valve 38 despite the formation of a fire adjacent to the valve 38.

As previously discussed, the controller 124 may be configured to determine a valve signature while the gate is in the open position without substantially restricting flow through the flow path 66. First, as represented by block 152, the gate 68 is driven a minute distance toward the closed position. Next, the displacement of the gate 68 is measured, as represented by block 154. The electrical current applied to the motorized ball screw actuator 48 is then measured, as represented by block 156. As previously discussed, the electrical current is related to the torque applied by the actuator 48, and the torque is translated into a force by the ball screw assembly 109. Consequently, the force applied by the actuator 48 is dependent on the supplied current. As a result, the measured electrical current supplied to the actuator 48 may be converted to a force applied to the gate 68. Based on the computed force and position, the valve signature may be determined, as represented by block 158. As will be appreciated, variation in valve signature from an expected force/distance relationship may be indicative of a worn or malfunctioning valve 38. Finally, as represented by block 160, the gate 68 is driven back to the open position. Because the gate 68 is only displaced a minute distance in the direction 72, the flow rate through the passage 66 may be substantially unaffected.

As represented by block 162, the fusible lock-open device 142 may be inserted into the actuating rod assembly 80 to hold the gate 68 in the open position. As previously discussed, the fusible lock-open device 142 is configured to disengage the actuating rod assembly 80 in the event of a fire such that the springs 88 and/or 116 drive the gate 68 toward the closed position. With the gate 68 in the closed position, flow of potentially flammable liquid through the passage 66 may be blocked. In this manner, the structural integrity of the valve 38 may be substantially maintained even if a fire is present adjacent to the valve 38.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
   a gate valve comprising:
      a valve body having a flow path;
      a gate disposed within the flow path, wherein the gate substantially blocks fluid flow through the flow path while the gate is in a closed position, and allows fluid flow through the flow path while the gate is in an open position;
      an actuator configured to transition the gate between the open position and the closed position, wherein the actuator comprises:

an outer casing;
a permanent magnet, direct current (DC) motor comprising a stator rigidly coupled to an interior of the outer casing, and a rotor configured to rotate with respect to the stator; and
an actuating rod assembly engaged with the rotor by a ball screw connection such that rotation of the rotor drives the actuating rod assembly along a longitudinal axis of the actuator, wherein the actuating rod assembly is directly and rigidly coupled to the gate without any gears and without any clutch between the permanent magnet DC motor and the gate.

2. The system of claim 1, wherein the actuator is configured to transition the gate toward the closed position with sufficient force to sever a conduit extending through the flow path of the valve body.

3. The system of claim 1, comprising a spring coupled to the actuating rod assembly, wherein the spring biases the gate toward the closed position.

4. The system of claim 3, comprising a fusible lock-open device configured to engage the actuating rod assembly to hold the gate in the open position against the spring bias while the actuator is disengaged, wherein the fusible lock-open device is configured to disengage the actuating rod assembly in the presence of a fire.

5. The system of claim 1, comprising a battery electrically coupled to the actuator and configured to power the motor.

6. The system of claim 5, comprising a solar panel electrically coupled to the battery, and configured to maintain a charge within the battery sufficient to power the motor.

7. The system of claim 1, comprising a controller communicatively coupled to the actuator, and a sensor communicatively coupled to the controller, wherein the sensor is configured to send a signal to the controller indicative of a fire adjacent to the gate valve, and the controller is configured to instruct the actuator to transition the gate toward the closed position in response to the signal.

8. The system of claim 1, comprising a controller communicatively coupled to the actuator, wherein the controller is configured to measure a torque applied by the motor to determine a valve signature, and the valve signature comprises a relationship between the torque and distance of travel of the gate.

9. A system comprising:
a gate valve comprising:
a gate disposed within a valve body; and
a motorized ball screw actuator having an electric motor, a ball screw connection directly coupled to a rotor of the electric motor, and an actuating rod assembly directly coupled to the ball screw connection and the gate, wherein the motorized ball screw actuator is configured to linearly actuate the actuating rod assembly to drive the gate between an open position and a closed position.

10. The system of claim 9, comprising a controller configured to receive a signal indicative of actuating force applied by the motorized ball screw actuator to the gate, wherein the controller is configured to compute a valve signature based on the signal, and the valve signature comprises a relationship between the actuating force and distance of travel of the gate.

11. The system of claim 10, comprising a load cell disposed within the actuating rod assembly, a strain gauge coupled to the actuating rod assembly, or a combination thereof, wherein the load cell, the strain gauge, or a combination thereof, is configured to output the signal indicative of actuating force.

12. The system of claim 10, wherein the signal indicative of actuating force comprises an electrical current applied to the motorized ball screw actuator.

13. The system of claim 9, wherein the motorized ball screw actuator is configured to transition the gate toward the closed position with greater than approximately 40,000 pounds of force to shear a line disposed within a fluid passage of the gate valve.

14. The system of claim 9, wherein the motorized ball screw actuator is configured to transition the gate to the closed position within approximately 5 seconds while substantially maintaining structural integrity of the gate and the valve body.

15. A method of operating a gate valve, comprising:
applying electrical current to a motorized ball screw actuator having an actuating rod assembly directly coupled to a gate of the gate valve such that the actuating rod assembly drives the gate between an open position and a closed position, wherein the motorized ball screw actuator comprises an electric motor, a ball screw connection directly coupled to a rotor of the electric motor, and the actuating rod assembly directly couples to the ball screw connection and the gate.

16. The method of claim 15, comprising receiving a signal indicative of a fire adjacent to the gate valve, and driving the gate to the closed position based on the signal.

17. The method of claim 15, comprising:
receiving a first signal indicative of a gate displacement of the gate;
receiving a second signal indicative of the electrical current applied to the motorized ball screw actuator, and the electrical current is indicative of an actuating force applied to the gate from the electric motor; and
determining a valve signature based on the first signal and the second signal, wherein the valve signature comprises a relationship between the actuating force and the gate displacement of the gate.

18. The method of claim 17, comprising:
applying electrical current to the motorized ball screw actuator while the gate is in the open position to transition the gate a minute distance toward the closed position without substantially reducing a flow rate through the gate valve;
receiving the first signal, receiving the second signal, and determining the valve signature; and
applying electrical current to the motorized ball screw actuator to transition the gate back to the open position.

19. The method of claim 15, comprising supplying the electrical current from a battery, and charging the battery with a solar panel.

20. The method of claim 15, comprising inserting a fusible lock-open device into the actuating rod assembly to hold the gate in the open position while the motorized ball screw actuator is deactivated, wherein the fusible lock-open device is configured to disengage the actuating rod assembly in the presence of a fire such that the gate transitions to the closed position via a spring bias.

* * * * *